(12) United States Patent
Okubo

(10) Patent No.: US 10,147,457 B1
(45) Date of Patent: Dec. 4, 2018

(54) MAGNETIC RECORDING DEVICE CAPABLE OF ADJUSTING HIGH FREQUENCY PATTERNS OF FIRST AND SECOND POLARITIES

(71) Applicants: Kabushiki Kaisha Toshiba, Minato-ku, Tokyo (JP); Toshiba Electronic Devices & Storage Corporation, Minato-ku, Tokyo (JP)

(72) Inventor: Tomokazu Okubo, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/911,696

(22) Filed: Mar. 5, 2018

(30) Foreign Application Priority Data

Sep. 4, 2017 (JP) .................................. 2017-169693

(51) Int. Cl.
| | |
|---|---|
| *G11B 20/18* | (2006.01) |
| *G11B 5/09* | (2006.01) |
| *G11B 20/10* | (2006.01) |
| G11B 5/00 | (2006.01) |
| G11B 20/16 | (2006.01) |
| G11B 20/14 | (2006.01) |

(52) U.S. Cl.
CPC .............. *G11B 20/182* (2013.01); *G11B 5/09* (2013.01); *G11B 20/10212* (2013.01); *G11B 20/14* (2013.01); *G11B 20/1407* (2013.01); *G11B 20/1419* (2013.01); *G11B 20/16* (2013.01); *G11B 2005/0026* (2013.01)

(58) Field of Classification Search
None
See application file for complete search history.

(56) References Cited

U.S. PATENT DOCUMENTS

| | | | | |
|---|---|---|---|---|
| 3,573,770 | A * | 4/1971 | Norris | ................ G11B 20/1419 360/43 |
| 4,475,212 | A * | 10/1984 | McLean | .................. H03M 5/18 375/286 |
| 4,933,939 | A | 6/1990 | Kendall et al. | |
| 4,965,873 | A * | 10/1990 | White | .................... G11B 5/035 360/40 |
| 5,185,765 | A * | 2/1993 | Walker | ................ H04L 27/2035 329/312 |
| 6,903,890 | B2 | 6/2005 | Aoyagi et al. | |
| 7,821,729 | B2 | 10/2010 | Ueno | |
| 2002/0140584 | A1 * | 10/2002 | Maeda | ............. G11B 20/10009 341/58 |

(Continued)

*Primary Examiner* — Tan X Dinh
(74) *Attorney, Agent, or Firm* — White & Case LLP

(57) ABSTRACT

According to one embodiment, a magnetic disk device including a disk, a head configured to write write data to the disk, and a controller configured to write first data including a high-frequency pattern, detect, from a reproduced waveform obtained by reading the written first data, a difference between a first percentage by which high-frequency patterns of a first polarity are lost and a second percentage by which high-frequency patterns of a second polarity obtained by reversing the first polarity are lost, and adjust a high-frequency pattern of the first polarity of the write data or a high-frequency pattern of the second polarity of the write data on the basis of the difference.

18 Claims, 16 Drawing Sheets

(56) References Cited

U.S. PATENT DOCUMENTS

| | | | | |
|---|---|---|---|---|
| 2005/0024759 A1* | 2/2005 | Sakai | ................... | G11B 5/012 |
| | | | | 360/48 |
| 2011/0310507 A1* | 12/2011 | Yoshida | ............. | G11B 5/59666 |
| | | | | 360/77.05 |
| 2013/0128375 A1* | 5/2013 | Livshitz | ................... | G11B 5/02 |
| | | | | 360/48 |

* cited by examiner

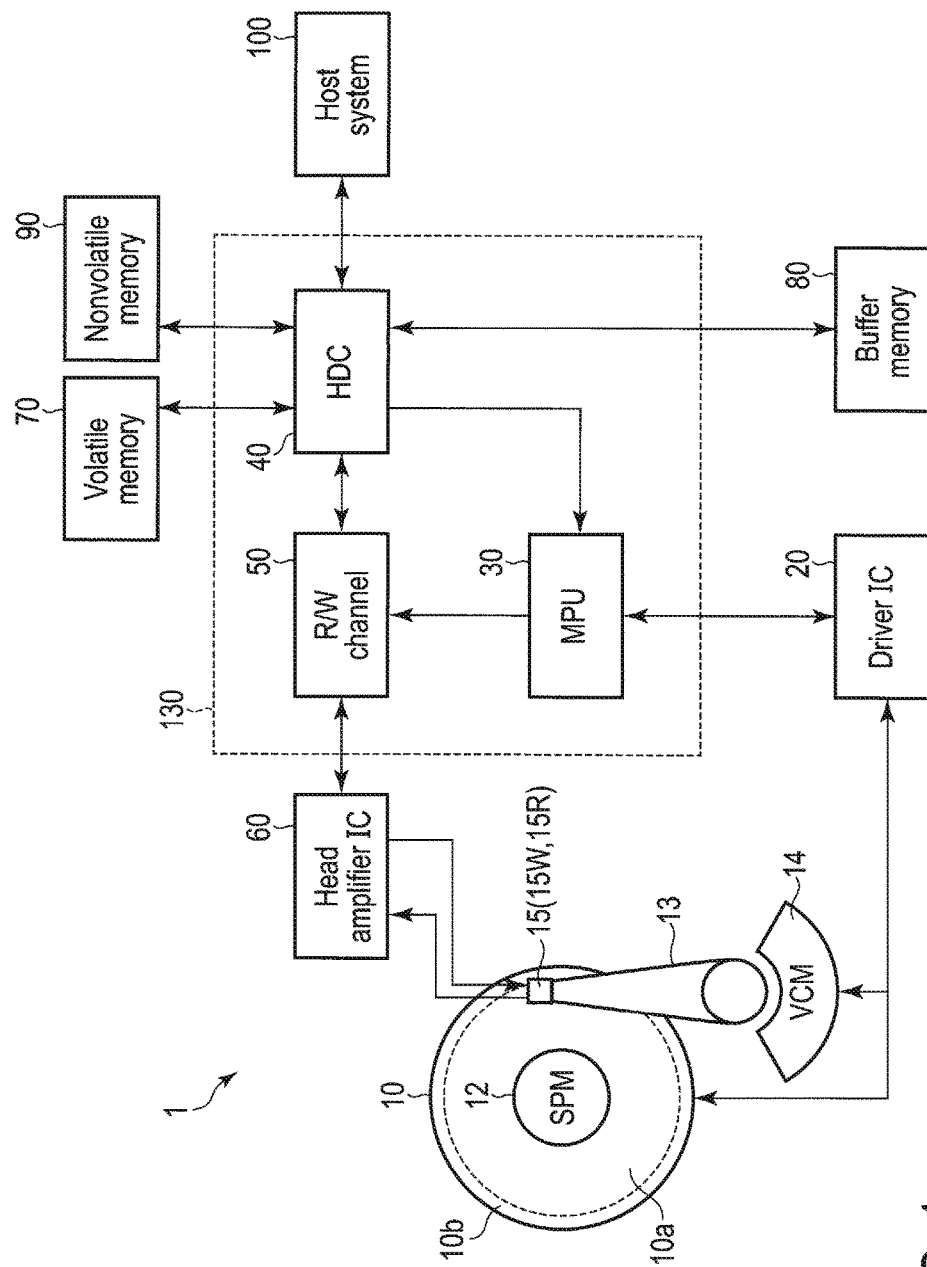
F I G. 1

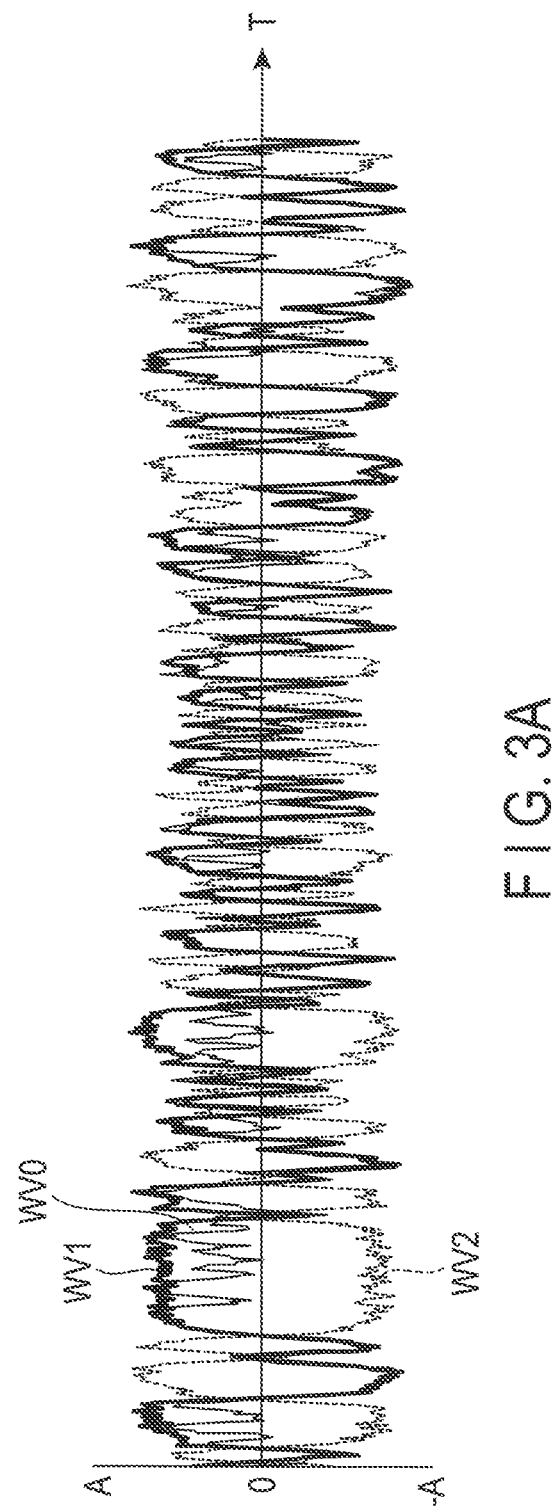

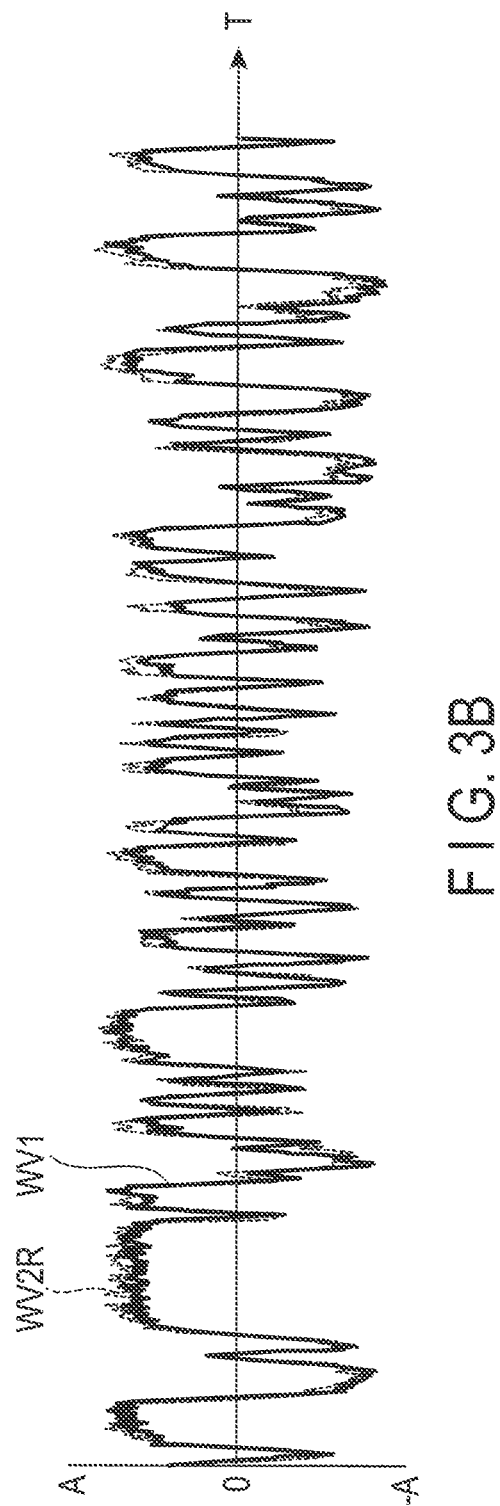

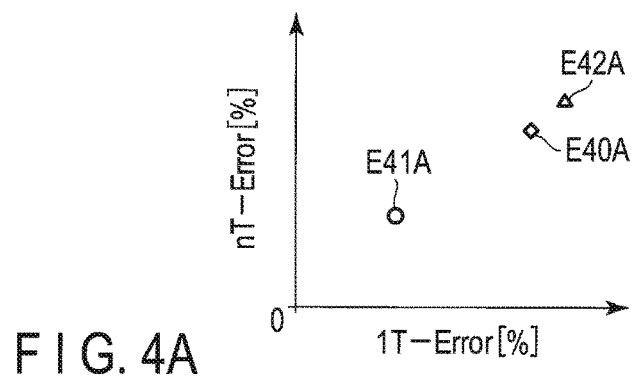
F I G. 4A
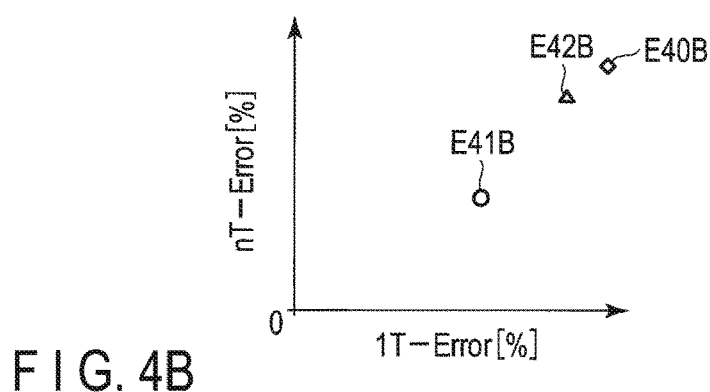
F I G. 4B
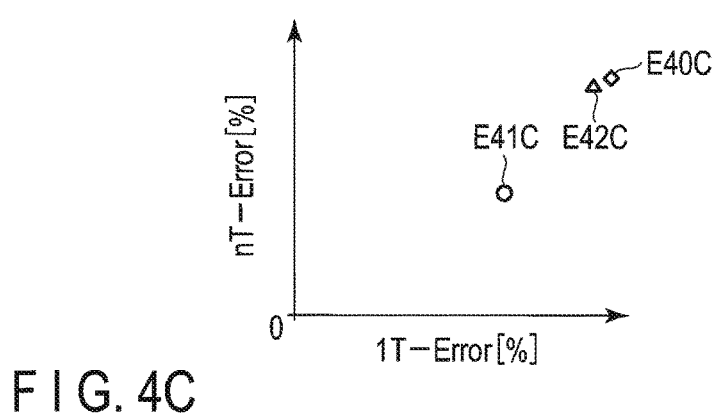
F I G. 4C

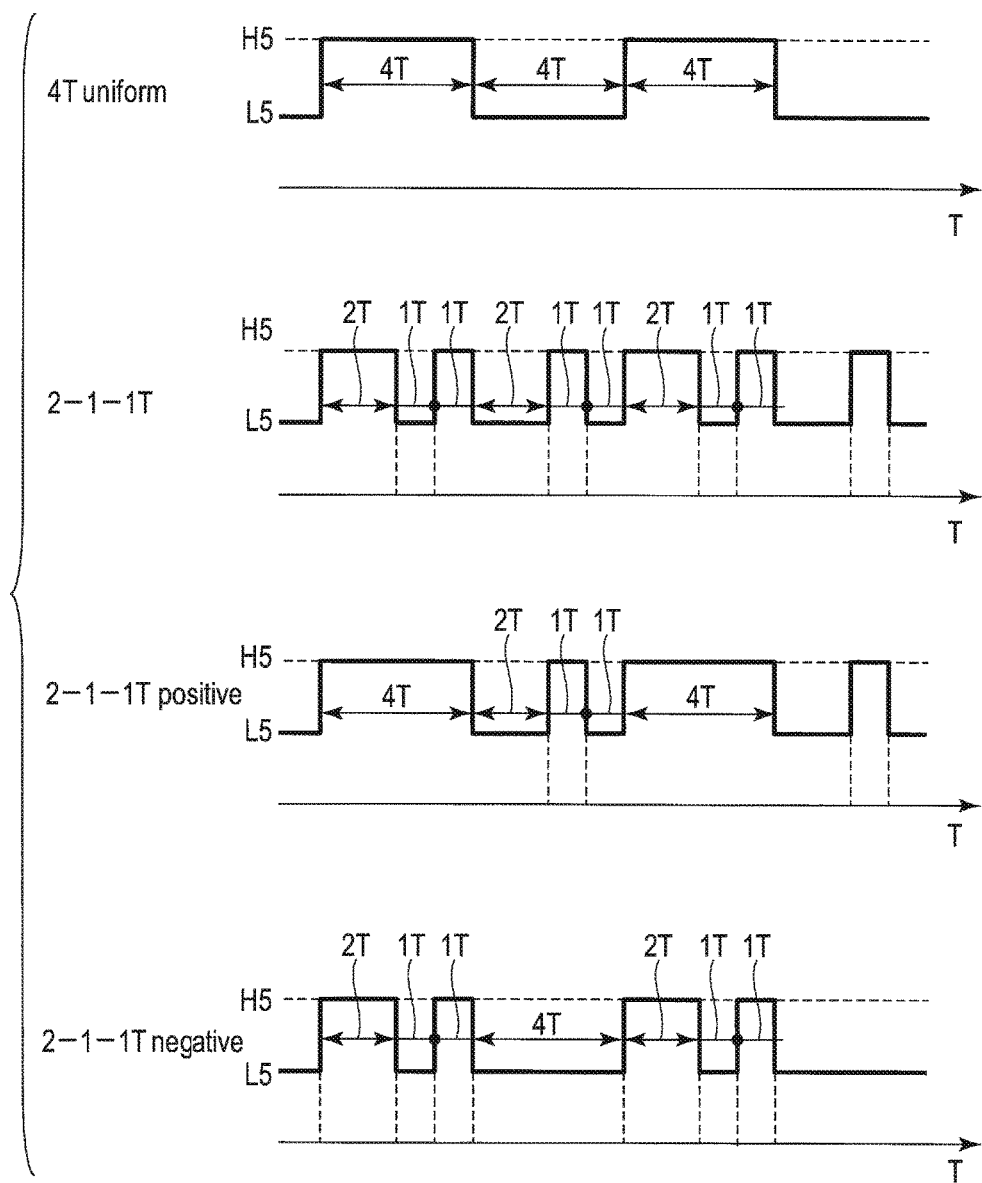
F I G. 5

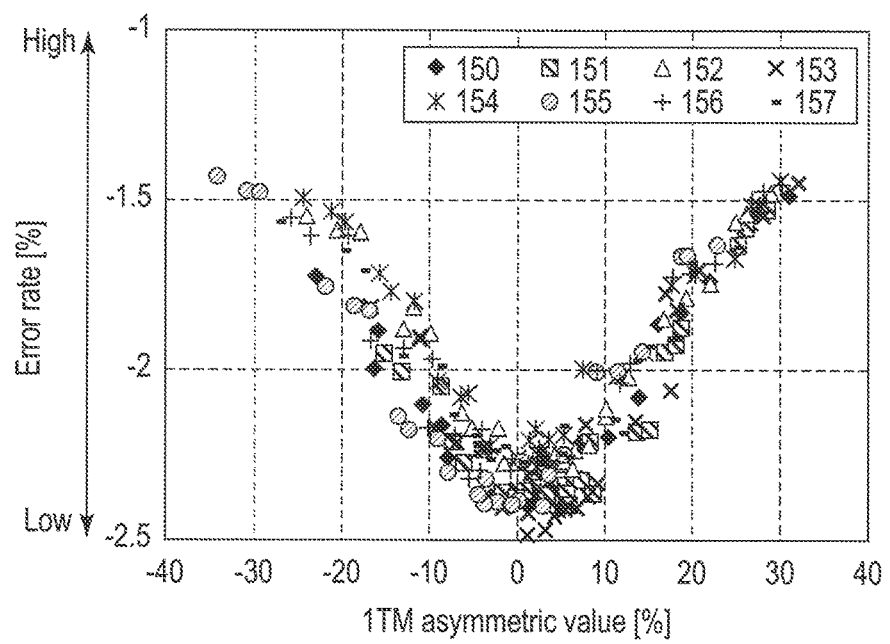
F I G. 6
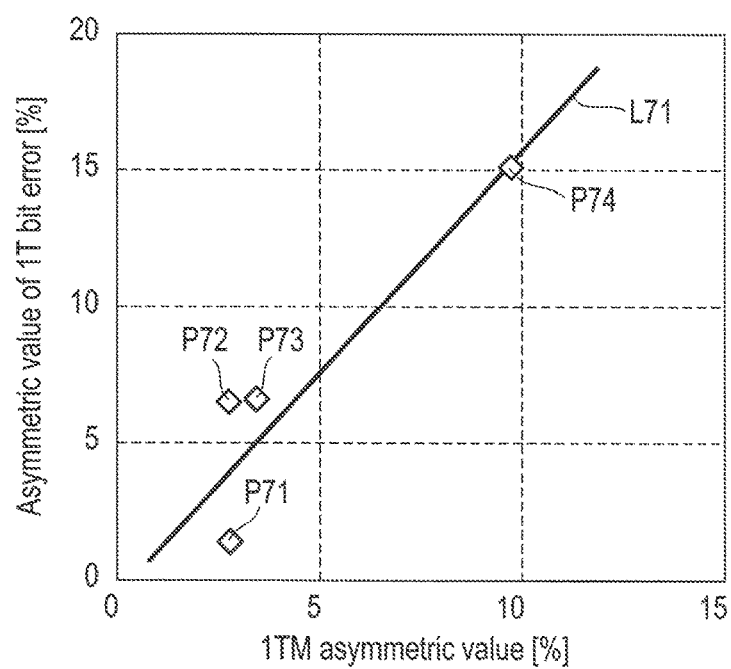
F I G. 7

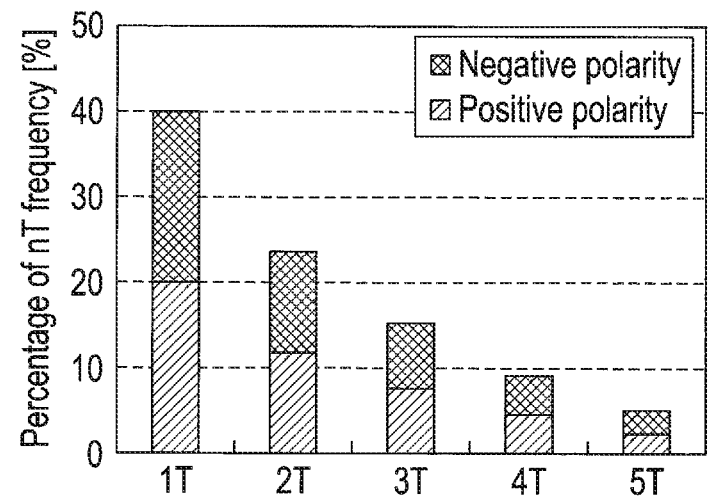
F I G. 9A
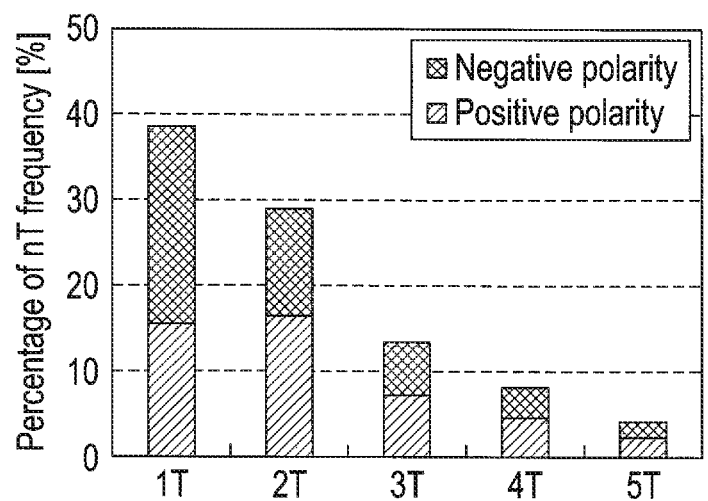
F I G. 9B

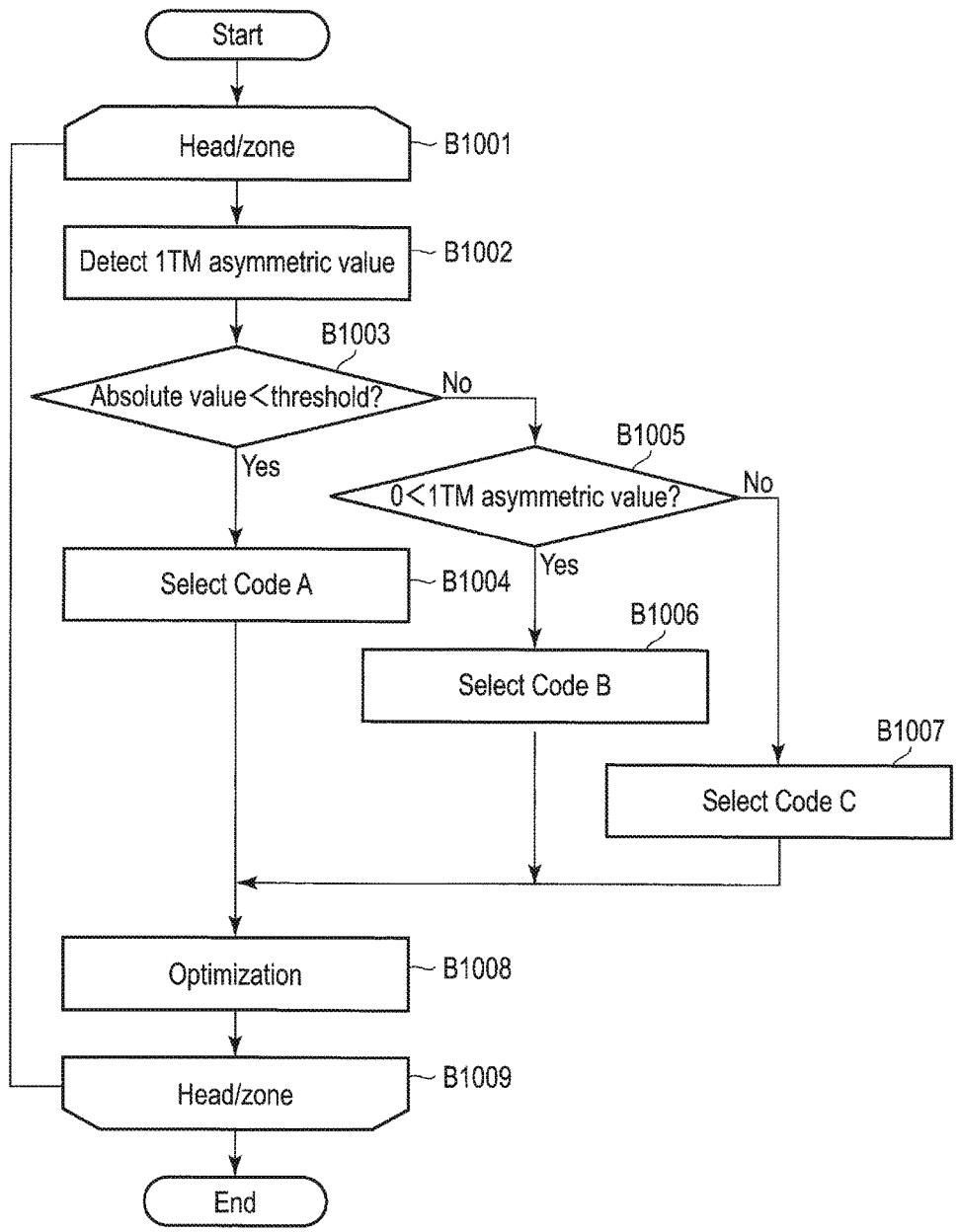
F I G. 10

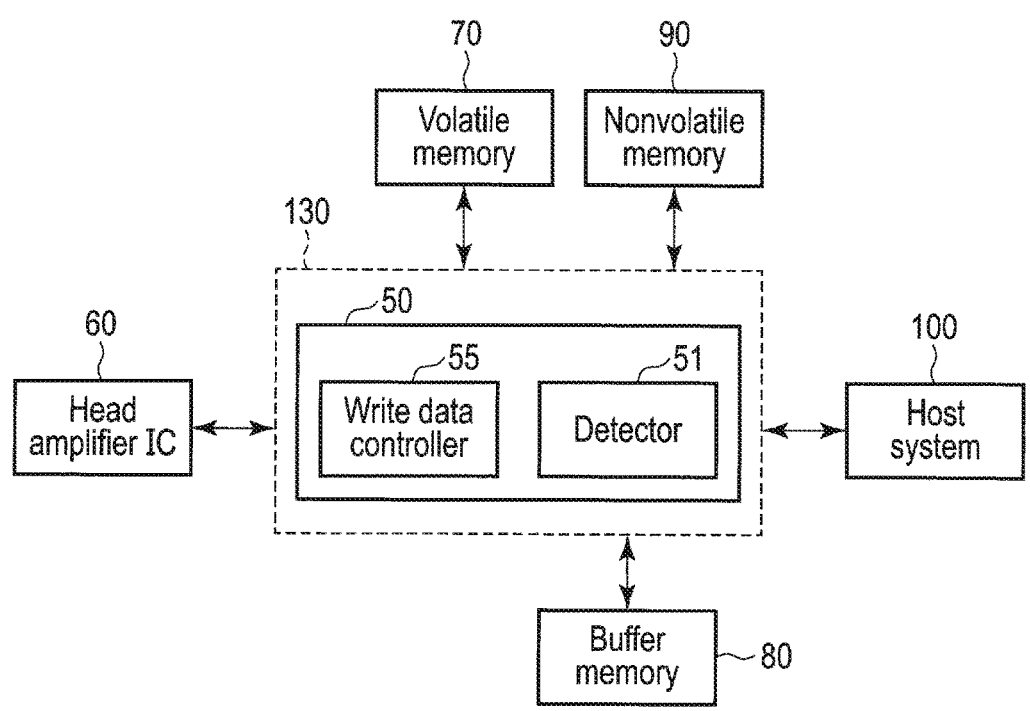
F I G. 11

MAGNETIC RECORDING DEVICE CAPABLE OF ADJUSTING HIGH FREQUENCY PATTERNS OF FIRST AND SECOND POLARITIES

CROSS-REFERENCE TO RELATED APPLICATIONS

This application is based upon and claims the benefit of priority from Japanese Patent Application No. 2017-169693, filed Sep. 4, 2017, the entire contents of which are incorporated herein by reference.

FIELD

Embodiments described herein relate generally to a magnetic disk device and write processing method.

BACKGROUND

A magnetic disk device subjects data including a large number of high-frequency patterns to encoding processing in write processing. For example, a magnetic disk device subjects data including data patterns of 1T bits to encoding processing by the Non-Return to Zero (NRZ) system. When the magnetic disk is to write data including data patterns of 1T bits to a disk, a high degree of responsiveness is required of the magnetic disk device for the reason that the physical length of data to be written on the basis of a data pattern of 1T bits is short. Accordingly, when write data including data patterns of 1T bits is written to a disk, there is a possibility of the recording quality of the written data being lowered. In the case where the data the recording quality of which is lowered is read, there is a possibility of the magnetic disk device determining that a read error occurs when the data read from the disk is subjected to decoding processing.

BRIEF DESCRIPTION OF THE DRAWINGS

FIG. 1 is a block diagram showing the configuration of a magnetic disk device according to a first embodiment;

FIG. 3A is a view showing an example of a reproduced waveform at the time when data written to a disk is read;

FIG. 3B is a view showing an example of a reproduced waveform at the time when data written to a disk is read;

FIG. 4A is a view showing an example of a relationship between the polarity of a data pattern of write data and a bit error rate at the time when data written to a disk is read;

FIG. 4B is a view showing an example of a relationship between the polarity of a data pattern of write data and a bit error rate at the time when data written to a disk is read;

FIG. 4C is a view showing an example of a relationship between the polarity of a data pattern of write data and a bit error rate at the time when data written to a disk is read;

FIG. 5 is a view showing examples of data patterns used in 1T-Missing processing;

FIG. 6 is a view showing an example of a correlation between an error rate and the 1TM asymmetry;

FIG. 7 is a view showing an example of a correlation between an asymmetric value of a 1T bit error and 1TM asymmetric value;

FIG. 9A is a view showing an example of occurrence frequency distribution of data patterns of nT in the write data shown in FIG. 8A;

FIG. 9B is a view showing an example of occurrence frequency distribution of data patterns of nT in the write data shown in FIG. 8B;

FIG. 10 is a flowchart of write processing according to the first embodiment;

FIG. 11 is a schematic view showing a configuration example of an R/W channel of a magnetic disk device according to a modification example 1;

DETAILED DESCRIPTION

Figure 2:
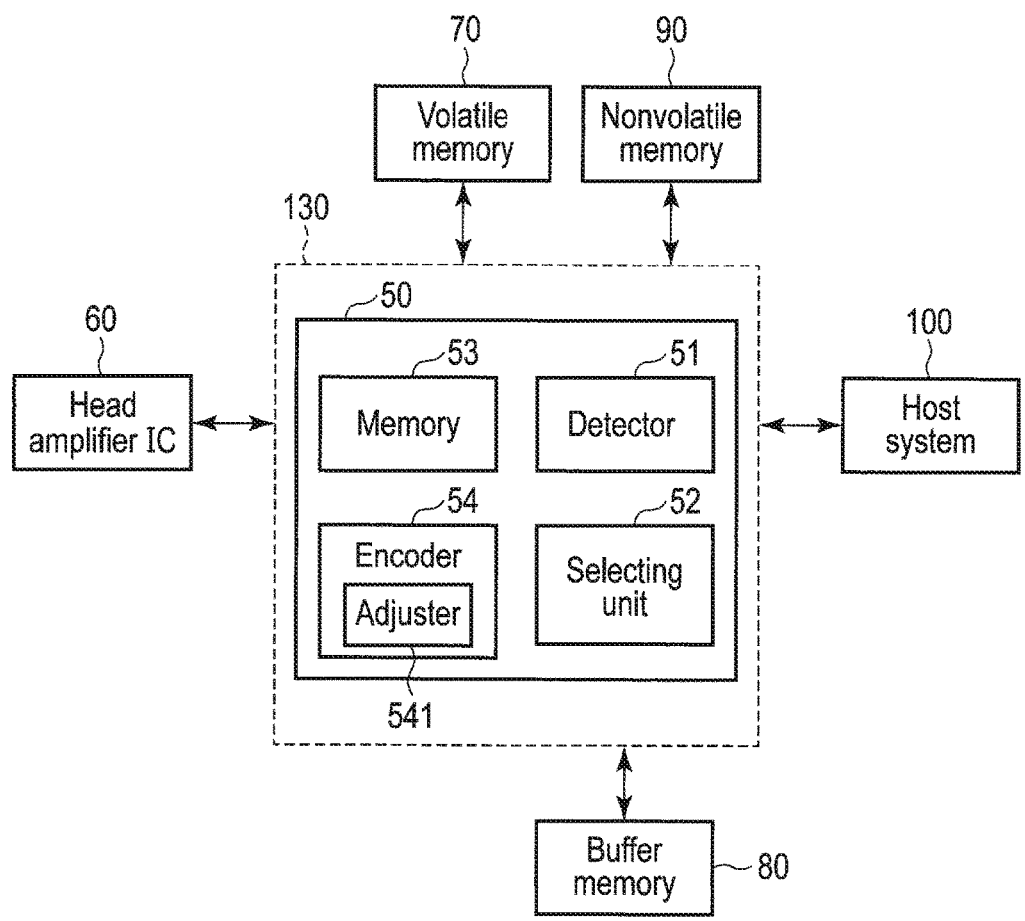
FIG. 2 is a configuration example of an R/W channel of the magnetic disk device according to the first embodiment.

In general, according to one embodiment, a magnetic disk device comprising: a disk; a head configured to write data to the disk; and a controller configured to write first data including a high-frequency pattern, detect, from a reproduced waveform obtained by reading the written first data, a difference between a first percentage by which high-frequency patterns of a first polarity are lost and a second percentage by which high-frequency patterns of a second polarity obtained by reversing the first polarity are lost, and adjust a high-frequency pattern of the first polarity of the write data or a high-frequency pattern of the second polarity of the write data on the basis of the difference.

According to another embodiment, a write processing method to be applied to a magnetic disk device including a disk and a head configured to write write data to the disk comprising: writing first data including a high-frequency pattern; detecting, from a reproduced waveform obtained by reading the written first data, a difference between a first percentage by which high-frequency patterns of a first polarity are lost and a second percentage by which high-frequency patterns of a second polarity obtained by reversing the first polarity are lost; and adjusting a high-frequency pattern of the first polarity of the write data or a high-frequency pattern of the second polarity of the write data on the basis of the difference.

Hereinafter, an embodiment will be described with reference to the accompanying drawings. It should be noted that drawings show only examples, and are not to limit the scope of the invention.

First Embodiment

FIG. 1 is a block diagram showing the configuration of a magnetic disk device 1 according to a first embodiment.

The magnetic disk device 1 is provided with a head disk assembly (HDA) to be described later, driver IC 20, head amplifier integrated circuit (hereinafter, head amplifier IC or preamplifier) 60, volatile memory 70, buffer memory (buffer) 80, nonvolatile memory 90, and system controller 130 which is a one-chip integrated circuit. Further, the magnetic disk device 1 is connected to a host system (host) 100.

The HDA includes a magnetic disk (hereinafter, a disk) 10, spindle motor (SPM) 12, arm 13 incorporating therein a head 15, and voice coil motor (VCM) 14. The disk 10 is rotated by the spindle motor 12. The arm 13 and VCM 14 constitute an actuator. The actuator controls the movement of the head 15 incorporated in the arm 13 to a target position on the disk 10 by the drive of the VCM 14. The disks 10 and heads 15 of a number greater than or equal to two may be provided.

In the disk 10, a recording area 10*a* which can be utilized by the user, and system area 10*b* to which information necessary for system management is written are allocated to the recording area thereof.

The head 15 is provided with a write head 15W and read head 15R which are mounted on a slider serving as a main body. The write head 15W writes data on the disk 10. The read head 15R reads data recorded on a data track on the disk 10.

The driver IC 20 controls drive of the SPM 12 and VCM 14 according to the control of the system controller 130 (more specifically, the MPU 30 to be described later).

The volatile memory 70 is a semiconductor memory in which the preserved data is lost when the supply power is shut off. The volatile memory 70 stores therein data and the like necessary for processing in each unit of the magnetic disk device 1. The volatile memory 70 is, for example, a Dynamic Random Access Memory (DRAM) or synchronous Dynamic Random Access Memory (SDRAM).

The buffer memory 80 is a semiconductor memory configured to temporarily store therein data and the like to be transmitted/received to/from the magnetic disk device 1/host 100. It should be noted that the buffer memory 80 may be formed integral with the volatile memory 70. The buffer memory 80 is for example, a DRAM, Static Random Access Memory (SRAM), SDRAM, Ferroelectric Random Access Memory (FeRAM), Magnetoresistive Random Access Memory (MRAM) or the like.

The nonvolatile memory 90 is a semiconductor memory in which the preserved data is kept preserved even when the supply power is shut off. The nonvolatile memory 90 is, for example, a NOR-type or NAND-type Flash Read Only Memory (FROM).

The system controller (controller) 130 is realized by using, for example, a large-scale integrated circuit (LSI) called a System-on-a-Chip (SoC) formed by integrating a plurality of elements into a single chip. The system controller 130 includes a microprocessor (MPU) 30, hard disk controller (HDC) 40, and read/write (R/W) channel 50. Each of the MPU 30, HDC 40, and R/W channel 50 includes a buffer (not shown) and register (not shown). The system controller 130 is electrically connected to the driver IC 20, head amplifier IC 60, volatile memory 70, buffer memory 80, nonvolatile memory 90, and host system 100.

The MPU 30 is a main controller configured to control each unit of the magnetic disk device 1. The MPU 30 controls the VCM 14 through the driver IC 20, and executes servo control of carrying out positioning of the head 15. The MPU 30 controls an operation of write of data to the disk 10, and selects a preservation destination of write data to be transferred thereto from the host 100. Further, the MPU 30 controls an operation of read of data from the disk 10, and controls processing of read data to be transferred from the disk 10 to the host 100. Hereinafter, there is sometimes a case where write data and read data are simply referred to as data. The MPU 30 executes processing on the basis of firmware. The MPU 30 is connected to each unit of the magnetic disk device 1. For example, the MPU 30 is electrically connected to the HDC 40 and R/W channel 50. It should be noticed that the MPU 30 may be electrically connected to the head amplifier IC 60.

The HDC 40 controls data transfer between the host 100 and R/W channel 50 in response to an instruction from the MPU 30. The HDC 40 is electrically connected to the MPU 30, R/W channel 50, volatile memory 70, buffer memory 80, nonvolatile memory 90, and host system 100.

The R/W channel 50 executes signal processing of read data and write data in response to an instruction from the MPU 30. The R/W channel 50 includes a circuit or function configured to measure the signal quality of read data. For example, the R/W channel 50 executes encoding processing of write data to be transferred thereto from the host 100. Further, the R/W channel 50 executes decoding processing of read data read from the disk 10. The R/W channel 50 is electrically connected to the MPU 30, HDC 40, and head amplifier IC 60.

In write processing, the head amplifier IC (preamplifier) 60 outputs a write current corresponding to write data to be input thereto from the R/W channel 50 to the write head 15W. Further, in read processing, the head amplifier IC 60 amplifies read data read by the read head 15R to output the read data to the read/write (R/W) channel 50. The head amplifier IC 60 includes a buffer (not shown), register (not shown), and register interface (not shown) configured to access the register from outside. The head amplifier IC 60 is electrically connected to the head 15 and R/W channel 50.

FIG. 2 is a schematic view showing a configuration example of the R/W channel 50 of the magnetic disk device 1 according to the first embodiment. In FIG. 2, only the configuration necessary for the explanation is shown.

In the system controller 130, the R/W channel 50 is provided with a detector 51, selecting unit 52, memory 53, and encoder 54. Each of these units is constituted of, for example, a circuit, and an operation thereof is controlled by the MPU 30 or HDC 40.

The detector 51 detects, in the signal processing to be executed while write data is transferred, a percentage by which high-frequency patterns of the positive polarity are lost, and percentage by which high-frequency patterns of the negative polarity are lost to thereby detect a difference between the percentage by which the high-frequency patterns of the positive polarity are lost and percentage by which the high-frequency patterns of the negative polarity are lost. For example, the high-frequency pattern is a data pattern of 1T or the like. For example, the detector 51 writes write data including data of 1T to a particular track of the disk 10, and reads the written data. The detector 51 detects a percentage by which data patterns of 1T of the positive polarity are lost and percentage by which data patterns of 1T of the negative polarity are lost from the read reproduced waveform for each head 15 and each zone of the disk 10. The detector 51 detects a difference between the detected percentage by which the data patterns of 1T of the positive polarity are lost and detected percentage by which the data patterns of 1T of the negative polarity are lost. A zone is a recording area constituted of a plurality of tracks of the disk 10. For example, the detector 51 can also record a detection result on the system area 10*b*, volatile memory 90, and the like. Hereinafter, the percentage by which the data patterns of 1T are lost is referred to as 1T-Missing, and processing of detecting 1T-Missing is referred to as 1T-Missing processing, and a difference between the 1T-Missing of the positive polarity and 1T-Missing of the negative polarity in particular write data is referred to as 1TM asymmetry (or is referred to as a 1TM asymmetric value).

Each of FIG. 3A and FIG. 3B is a view showing an example of a reproduced waveform obtained when data written to a disk 10 is read. In FIG. 3A and FIG. 3B, the axis of abscissa indicates the time, and axis of ordinate indicates the amplitude (hereinafter referred to as a signal level in some cases). In FIG. 3A and FIG. 3B, an amplitude A corresponds to a positive value (value of the positive polarity), and amplitude (−A) corresponds to a negative value (value of the negative polarity).

In FIG. 3A, a waveform WV0 indicates a reproduced waveform obtained when particular data written to the disk 10 is read. The particular data is, for example, data in which data patterns of the positive polarity and data patterns of the negative polarity are perfectly random and which corresponds to write data of the Non-Return to Zero (NRZ) system. A waveform WV1 indicates a reproduced waveform obtained when data written to the disk 10 by eliminating a data pattern of 1T of the positive polarity from the particular data forming the waveform WV0 is read. A waveform WV2 indicates a reproduced waveform obtained when data written to the disk 10 by reversing the positive/negative polarities of the write data of the waveform WV1 is read.

In FIG. 3B, a waveform WV2R indicates a reproduced waveform obtained by polarity-reversing the waveform WV2 shown in FIG. 3A. A waveform WV1 indicates a waveform identical to the waveform WV1 shown in FIG. 3A.

As shown in FIG. 3B, the waveform WV2R formed by polarity-reversing the waveform WV2 has a shape approximately identical to the waveform WV1, however, as a whole the waveform WV2R particularly has a smaller amplitude of the high-frequency patterns such as the patterns of 1T as compared with the waveform WV1. That is, there is a possibility of the waveform WV2R being more deteriorated in the recording quality of data written to the disk 10 than the waveform WV1. In other words, there is a possibility of the waveform WV2 being more deteriorated in the recording quality of data written to the disk 10 than the waveform WV1. Such a difference between the waveform WV1 and waveform WV2R (waveform WV2) indicates that a difference in easiness of writing data to the disk 10 caused by the polarity of the data pattern has occurred. The difference in easiness of writing data to the disk 10 dependent on the polarity of the data pattern is attributable to the characteristics of the head 15 and zone of the disk 10, and condition or the like of data transfer.

Each of FIG. 4A, FIG. 4B, and FIG. 4C is a view showing an example of a relationship between the polarity of a data pattern of write data and a bit error rate (BER) at the time when data written to the disk 10 is read. Hereinafter, the bit error rate (BER) at the time when data written to the disk 10 is read is referred to as an error rate in some cases. In FIG. 4A through FIG. 4C, the axis of ordinate indicates the bit error rate [%] of the data pattern of nT at the time when data written to the disk 10 is read, and axis of abscissa indicates the bit error rate (hereinafter referred to as a 1T bit error) [%] of the data pattern of 1T at the time when data written to the disk 10 is read. Here, n indicates positive integers (2, 3 . . . ) excluding 1. Each of FIG. 4A through FIG. 4C shows a result of measurement carried out by using a different head 15. In FIG. 4A through FIG. 4C, each of error rates E40A, E40B, and E40C indicates an error rate (hereinafter referred to as a normal error rate) at the time when the particular data which is to form the waveform WV0 shown in FIG. 3A and is written to the disk 10 is read. In FIG. 4A through FIG. 4C, each of error rates E41A, E41B, and E41C indicates an error rate (hereinafter referred to as an error rate including 1T of the negative polarity) at the time when data written to the disk 10 by eliminating a data pattern of 1T of the positive polarity from the particular data forming the waveform WV1 shown in FIG. 3A is read. In FIG. 4A through FIG. 4C, each of error rates E42A, E42B, and E42C indicates an error rate (hereinafter referred to as an error rate including 1T of the positive polarity) at the time when data written to the disk 10 by writing a pattern obtained by reversing the NRZ polarity of data corresponding to the waveform WV1 and forming the waveform WV2 (WV2R) shown in FIG. 3A is read.

In the example shown in FIG. 4A, the error rate E42A including the normal error rate E40A and 1T of the positive polarity is greater than the error rate E41A including 1T of the negative polarity. The normal error rate E40A and error rate 42A including 1T of the positive polarity are values close to each other. In the example shown in FIG. 4B, the normal error rate E40B and error rate 42B including 1T of the positive polarity are greater than the error rate E41B including 1T of the negative polarity. The normal error rate E40B and error rate 42B including 1T of the positive polarity are values close to each other. In the example shown in FIG. 4C, the normal error rate E40C and error rate E42C including 1T of the positive polarity are greater than the error rate E41C including 1T of the negative polarity. The normal error rate E40C and error rate 42C including 1T of the positive polarity are values close to each other. In the examples shown in FIG. 4A through FIG. 4C, it can be considered that the 1T bit error (hereinafter referred to as a 1T bit error of the positive polarity) at the time when data including a data pattern of 1T of the positive polarity is read dominantly influences the normal error rate. Further, in the examples shown in FIG. 4A through FIG. 4C, it can be considered that the 1T bit error (hereinafter referred to as a 1T bit error of the negative polarity) at the time when data including a data pattern of 1T of the negative polarity is read does not significantly influence the normal error rate. That is, it can be considered that the 1T bit error of the negative polarity has a margin until the 1T bit error of the negative polarity exerts an influence upon the normal error rate as compared with the 1T bit error of the positive polarity. In the examples shown in FIG. 4A through FIG. 4C, it can be considered that the 1T bit error of the positive polarity can be made small, and the 1T bit error of the negative polarity can be made large. It can be considered that the normal error rate is improved by making the 1T bit error of the positive polarity small, and making the 1T bit error of the negative polarity large. It should be noted that there can be a case where the normal error rate and error rate including 1T of the negative polarity are greater than the error rate including 1T of the positive polarity. In this case, it can be considered that the 1T bit error of the positive polarity has a margin until the 1T bit error of the positive polarity exerts an influence on the normal error rate as compared with the 1T bit error of the negative polarity. Accordingly, it can be considered that the normal error rate is improved by making the 1T bit error of the positive polarity large, and making the 1T bit error of the negative polarity small. As described above, the normal error rate can be improved by adjusting the difference (hereinafter referred to as asymmetry of the 1T bit error or an asymmetric value of the 1T bit error) between the 1T bit error of the positive polarity and 1T bit error of the negative polarity. In other words, the normal error rate can be improved by adjusting a difference between an occurrence frequency (appearance frequency) of a data pattern of 1T of the positive polarity in the write data and occurrence frequency of a data pattern of 1T of the negative polarity.

The 1T bit error of the positive polarity and 1T bit error of the negative polarity are detected from the examples shown in FIG. 3A through FIG. 4C, and the asymmetry of the 1T bit error is adjusted, whereby the normal error rate can be improved. However, it is practically difficult to detect the 1T bit error of the positive polarity and 1T bit error of the negative polarity. Accordingly, in this embodiment, the asymmetry of the 1T bit error is estimated from the 1TM asymmetry.

FIG. 5 is a view showing examples of data patterns used in 1T-Missing processing. Data of "4T uniform" (uppermost data of FIG. 5) shown in FIG. 5 indicates data (hereinafter referred to as 4T data) in which a data pattern of 4T is repeated while the polarity thereof is reversed. Data of "2-1-1T" (second data from the uppermost data of FIG. 5) shown in FIG. 5 indicates data (hereinafter referred to as 2-1-1T data) in which a data pattern of 2-1-1T is repeated while the polarity thereof is reversed. Here, the data pattern of 2-1-1T includes a data pattern of 2T, data pattern of 1T the polarity of which is obtained by reversing the polarity of the data pattern of 2T after the data pattern of 2T, and data pattern of 1T the polarity of which is obtained by reversing the polarity of the preceding data pattern of 1T after the data pattern of 1T. For example, the data pattern (hereinafter referred to as a data pattern of 2-1-1T of the negative polarity in some cases) of 2-1-1T includes a data pattern of 2T of the positive polarity, data pattern of 1T of the negative polarity, and data pattern of 1T of the positive polarity. Further, the data pattern (hereinafter referred to as a data pattern of 2-1-1T of the positive polarity in some cases) of 2-1-1T includes a data pattern of 2T of the negative polarity, data pattern of 1T of the positive polarity, and data pattern of 1T of the negative polarity. Data of "2-1-1T positive" (third data from the uppermost data of FIG. 5) shown in FIG. 5 indicates data (hereinafter referred to as 2-1-1T data of the positive polarity) in which a data pattern obtained by eliminating a data pattern of 1T of the negative polarity from the data pattern of 2-1-1T included in the data of "2-1-1T" shown in FIG. 5 is repeated while the polarity thereof is reversed. That is, the 2-1-1T data of the positive polarity is data in which a data pattern of 4T and data pattern of 2-1-1T of the positive polarity are repeated. Data of "2-1-1T negative" (fourth data from the uppermost data of FIG. 5) shown in FIG. 5 indicates a reproduced waveform of data (hereinafter referred to as 2-1-1T data of the negative polarity) in which a data pattern obtained by eliminating a data pattern of 1T of the positive polarity from data pattern of 2-1-1T included in the data of "2-1-1T" shown in FIG. 5 is repeated while the polarity thereof is reversed. That is, the 2-1-1T data of the negative polarity is data in which a data pattern of 2-1-1T of the negative polarity and data pattern of 4T are repeated. In FIG. 5, the axis of abscissa indicates the time T. In FIG. 5, the signal level (voltage level, current level or amplitude) H5 is higher than the signal level L5.

Normally, the 1T-Missing is detected from a ratio of a signal output (hereinafter referred to as 4T output) of a 4T frequency component in the reproduced waveform output on the basis of the 4T data included in the data of "4T uniform" shown in FIG. 5 to a 4T output in the reproduced waveform output on the basis of the 2-1-1T data included in the data of "2-1-1T" shown in FIG. 5. The fact that a data pattern of 4T is output in the reproduced signal output on the basis of the 2-1-1T data indicates that a reproduced signal of 1T is not output due to deterioration of the recording quality. For this reason, the 1T-Missing becomes larger when the 4T output in the reproduced signal output on the basis of the 2-1-1T data becomes larger, and becomes smaller when the 4T output in the reproduced signal output on the basis of the 2-1-1T data becomes smaller. In this embodiment, the 1T-Missing of the positive polarity is detected from the ratio of the 4T output in the reproduced signal output on the basis of the 4T data included in the data of "4T uniform" shown in FIG. 5 to the 4T output in the reproduced signal output on the basis of the 2-1-1T data of the positive polarity included in the data of "2-1-1T positive" shown in FIG. 5. For example, the detector 51 utilizes the Harmonic Sensor Circuit (HSC) for detection of the 4T output. The HSC is incorporated in, for example, the R/W channel 50. Further, the 1T-Missing of the negative polarity is detected from the ratio of the 4T output in the reproduced signal output on the basis of the 4T data included in the data of "4T uniform" shown in FIG. 5 to the 4T output in the reproduced signal output on the basis of the 2-1-1T data of the negative polarity included in the data of "2-1-1T negative" shown in FIG. 5.

The detector 51 detects the 4T output in the reproduced signal output on the basis of the 4T data included in the data of "4T uniform" shown in FIGS. 5, and 4T output in the reproduced signal output on the basis of the 2-1-1T data of the positive polarity included in the data of "2-1-1T positive" shown in FIG. 5. The detector 51 detects the 1T-Missing of the positive polarity from the ratio of the 4T output in the reproduced signal output on the basis of the 4T data to the 4T output in the reproduced signal output on the basis of the 2-1-1T data of the positive polarity.

Further, the detector 51 detects the 4T output in the reproduced signal output on the basis of the 4T data included in the data of "4T uniform" shown in FIG. 5, and the 4T output in the reproduced signal output on the basis of the 2-1-1T data of the negative polarity shown in the data of "2-1-1T negative" shown in FIG. 5. The detector 51 detects the 1T-Missing of the negative polarity from the ratio of the 4T output in the reproduced signal output on the basis of the 4T data to the 4T output in the reproduced signal output on the basis of the 2-1-1T data of the negative polarity.

The detector 51 detects the 1TM asymmetry (1TM asymmetric value) from a difference between the 1T-Missing of the positive polarity and 1T-Missing of the negative polarity. For example, when the 1TM asymmetric value is a positive value, it is indicated that the 1T-Missing of the positive polarity is large. Further, when the 1TM asymmetric value is a negative value, it is indicated that the 1T-Missing of the negative polarity is large.

FIG. 6 is a view showing an example of a correlation between a bit error rate and the 1TM asymmetry. In FIG. 6, the axis of ordinate indicates the bit error rate [%], and axis of abscissa indicates the 1TM asymmetric value [%]. FIG. 6 shows a measurement result of bit error rates when data written to the disk 10 by using the heads 150, 151, 152, 153, 154, 155, 156, and 157 is read. In FIG. 6, the bit error rates are measured while the 1TM asymmetric value is adjusted. It should be noticed that the head 15 may include the plurality of heads 150 through 157.

In the example shown in FIG. 6, as the positive value of the 1TM asymmetric value becomes larger, the bit error rate becomes larger. As the negative value of the 1TM asymmetric value becomes smaller, the bit error rate becomes larger. When the 1TM asymmetric value becomes 0, the bit error rate becomes the smallest. From the measurement result shown in FIG. 6, it can be seen that the bit error rate is improved by making the 1TM asymmetric value closer to 0.

FIG. 7 is a view showing an example of a correlation between an asymmetric value of a 1T bit error and 1TM asymmetric value. In FIG. 7, the axis of ordinate indicates the asymmetric value of the 1T bit error [%]. The asymmetric value of a 1T bit error is specified by a difference between the 1T bit error of the positive polarity and 1T bit error of the negative polarity. The axis of abscissa indicates the 1TM asymmetric value [%]. In FIG. 7, the asymmetric values of 1T bit errors P71, P72, P73, and P74 indicate a measurement result of the asymmetric values of 1T bit errors at the time when data written to the disk 10 by using the head 15 is read. For example, the head 15 may be one of the heads 150 through 157 shown in FIG. 6. In FIG. 7, the asymmetric values of the 1T bit errors are measured while the 1TM asymmetric values are adjusted. Further, in FIG. 7, a line L71 is an approximation straight line of the asymmetric values of the 1T bit errors P71 through P74.

In the example shown in FIG. 7, as the 1TM asymmetric value becomes larger, the asymmetric value of the 1T bit error becomes larger. Further, from the line L71 shown in FIG. 7, it can be seen that the 1TM asymmetric value and asymmetric value of the 1T bit error are in a proportional relationship. From the fact described above, it is possible to estimate the asymmetric value of the 1T bit error from the 1TM asymmetric value. Further, by improving the 1TM asymmetric value, it is possible to improve the asymmetric value of the 1T bit error.

The selecting unit 52 selects an adjustment method (Code) of a data pattern of write data used to adjust the 1TM asymmetric value on the basis of a detection result of the detector 51. For example, when the 1TM asymmetric value is smaller than a threshold, the selecting unit 52 does not adjust the data pattern but selects a Symmetry Code (hereinafter referred to as a Code A) used to execute normal signal processing. When the 1TM asymmetric value is a positive value, and is greater than or equal to the threshold, the selecting unit 52 selects an Asymmetry Code (hereinafter referred to as a Code B) used to adjust a data pattern of 1T of the positive polarity. Further, when the 1TM asymmetric value is a negative value, and is smaller than the threshold, the selecting unit 52 selects an Asymmetry Code (hereinafter referred to as a Code C) used to adjust a data pattern of 1T of the negative polarity. The Code A, Code B, and Code C may be recorded as a table in, for example, the memory 53. Further, the Code A, Code B, and Code C may be recorded as a table in, for example, the nonvolatile memory 90. The thresholds are positive/negative 1T asymmetric values having the same absolute value. As an example, the thresholds are +10% and −10%. The thresholds are recorded in, for example, the memory 53. Further, the thresholds may be recorded in the nonvolatile memory 90. Further, the memory 53 may be omitted.

The encoder 54 subjects write data to encoding processing. The encoder 54 is provided with an adjuster 541.

The adjuster 541 adjusts a data pattern of write data of a polarity corresponding to a 1TM asymmetric value according to an instruction of the selecting unit 52. For example, the adjuster 541 adjusts a data pattern of write data of a polarity corresponding to a 1TM asymmetric value by means of the Asymmetry Code used to adjust the occurrence frequency of a data pattern of 1T of the positive polarity, and occurrence frequency of a data pattern of 1T of the negative polarity according to an instruction of the selecting unit 52. It should be noted that the adjuster 541 may be provided in the R/W channel 50 as one body separate from the encoder 54.

Figure 8A:
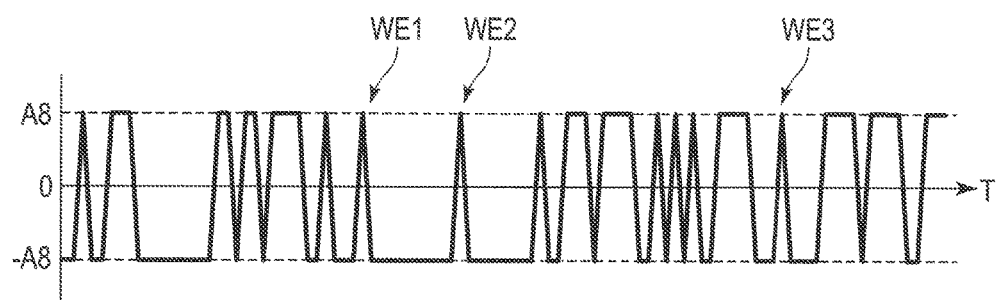
FIG. 8A is a view showing an example of a Asymmetry Code.
Figure 8B:
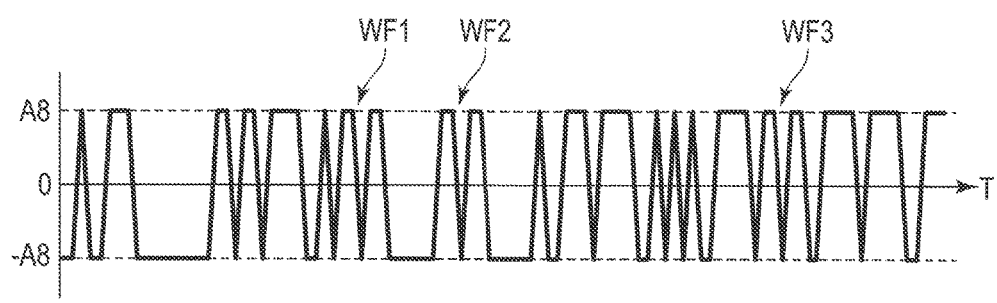
FIG. 8B is a view showing an example of an Asymmetry Code.

Each of FIG. 8A and FIG. 8B is a view showing an example of an Asymmetry Code. In FIG. 8A and FIG. 8B, the axis of ordinate indicates an NRZ amplitude (polarity of data) of write data, and axis of abscissa indicates the time. FIG. 8A shows the NRZ series of write data before being adjusted by using the Asymmetry Code. FIG. 8B shows the NRZ series of write data after being adjusted by using the Asymmetry Code.

Regarding the Asymmetry Code, the adjuster 541 reduces the occurrence frequency of a data pattern of 1T of a polarity corresponding to the 1TM asymmetric value exceeding the threshold. In the examples shown in the drawings, the adjuster 541 reverses the polarity of the data pattern of mT-1T-oT (m, o>1) to thereby adjust the occurrence frequency of the data pattern of 1T of the positive polarity or negative polarity. For example, when the 1TM asymmetric value is a positive value, and exceeds the threshold, the adjuster 541 executes the polarity reversal processing of changing the data patterns of 5T including data patterns of 1T, i.e., WE1, WE2, and WE3 shown in FIG. 8A into the data patterns of 5T, i.e., WF1, WF2, and WF3 shown in FIG. 8B. In other words, in the examples shown in the drawings, the adjuster 541 reduces the occurrence frequency of data patterns of 1T of the positive polarity, and increases the occurrence frequency of data patterns of 1T of the negative polarity.

Each of FIG. 9A and FIG. 9B is a view showing an example of occurrence frequency distribution of a data pattern of nT in the write data shown in FIG. 8A or FIG. 8B. In FIG. 9A and FIG. 9B, the axis of ordinate indicates the percentage (hereinafter referred to as a percentage of data patterns) [%] of each nT frequency to the whole write data shown in FIG. 8A and FIG. 8B, and axis of abscissa indicates the data pattern of nT. In FIG. 9A and FIG. 9B, the percentage (hereinafter referred to as a percentage of data patterns of the positive polarity) of data patterns of the positive polarity to the whole write data shown in FIG. 8A and FIG. 8B in the data patterns of nT, and percentage (hereinafter referred to as a percentage of data patterns of the negative polarity) of data patterns of the negative polarity to the whole write data shown in FIG. 8A and FIG. 8B are shown. In FIG. 9A and FIG. 9B, the percentage of the data patterns of the positive polarity is indicated by hatched lines, and percentage of the data patterns of the negative polarity is indicated by mesh patterns. FIG. 9A shows an example of occurrence frequency distribution of data patterns of nT in the write data before being adjusted by using the Asymmetry Code shown in FIG. 8A. FIG. 9B shows an example of occurrence frequency distribution of data patterns of nT in the write data after being adjusted by using the Asymmetry Code shown in FIG. 8B.

As described in connection with FIG. 8A and FIG. 8B, the adjuster 541 adjusts the occurrence frequency of the data patterns of 1T of the positive polarity, and occurrence frequency of the data patterns of 1T of the negative polarity by subjecting, for example, the data pattern of mT-1T-oT to polarity reversal. Accordingly, the state where the percentage of the data patterns of 1T of the positive polarity and percentage of the data patterns of 1T of the negative polarity are approximately identical to each other as shown in FIG. 9A is changed into the state where the percentage of the data patterns of 1T of the negative polarity is greater than the percentage of the data patterns of 1T of the positive polarity as shown in FIG. 9B. The percentage of the data patterns of 1T shown in FIG. 9A and percentage of the data patterns of 1T shown in FIG. 9B are nearly identical to each other. As described above, the adjuster 541 adjusts the occurrence frequency of the data patterns of 1T of the positive polarity and occurrence frequency of the data patterns of 1T of the negative polarity, whereby the adjuster 541 can reduce the occurrence frequency of the data patterns of 1T of the positive polarity or occurrence frequency of the data patterns of 1T of the negative polarity almost without changing the occurrence frequency of the data patterns of 1T of the whole data. The occurrence frequency of the data patterns of 1T of the whole data is hardly changed, and hence the encoding rate of the write data is hardly affected. It should be noted that data patterns of 2T or more do not considerably affect the bit error rate.

FIG. 10 is a flowchart of write processing according to the first embodiment.

The controller 130 executes write processing of write data transferred thereto from the host 100 for each head 15 and each zone of the disk 10 (B1001). The controller 130 detects a 1TM asymmetric value (B1002). The controller 130 determines whether the absolute value of the 1TM asymmetric value is smaller than a threshold value or is greater than or equal to the threshold (B1003). Upon determination that the absolute value of the 1TM asymmetric value is smaller than the threshold (YES of B1003), the controller 130 selects the Code A (B1004), and advances to the processing of B1008. For example, the controller 130 subjects the write data to normal signal processing without adjusting the data pattern. Upon determination that the absolute value of the 1TM asymmetric value is greater than or equal to the threshold (NO of B1003), the controller 130 determines whether the 1TM asymmetric value is greater than 0 or is smaller than 0 (B1005). Upon determination that the 1TM asymmetric value is greater than 0 (YES of B1005), the controller 130 selects the Code B (B1006), and advances to the processing of B1008. For example, the controller 130 reduces the occurrence frequency of the data patterns of 1T of the positive polarity. Upon determination that the 1TM asymmetric value is smaller than 0 (NO of B1005), the controller 130 selects the Code C (B1007), and advances to the processing of B1008. For example, the controller 130 reduces the number of the data patterns of 1T of the negative polarity. The controller 130 optimizes the setting (B1008). The substantial recording quality is changed by code selection, and hence the controller 130 readjusts the parameters (WPC, FIR, and the like) of the R/W channel 50 as, for example, the optimization processing of B1008. The controller 130 repeats the processing from B1002 through B1008 for each head 15 and each zone of the disk 10 until the write processing of the write data transferred thereto from the host 100 is completed, and then terminates the write processing.

According to this embodiment, in the signal processing of write data, the magnetic disk device 1 detects a percentage by which high-frequency patterns of the positive polarity are lost, and percentage by which high-frequency patterns of the negative polarity are lost to thereby detect a difference between the percentage by which the high-frequency patterns of the positive polarity are lost and percentage by which the high-frequency patterns of the negative polarity are lost. The magnetic disk device 1 determines whether an absolute value of the detected difference is smaller than a threshold or is greater than or equal to the threshold. Upon determination that the absolute value of the detected difference is greater than or equal to the threshold, the magnetic disk device 1 determines whether the detected difference is a positive value or is a negative value. When the detected difference is a positive value, the magnetic disk device 1 adjusts an occurrence frequency of the high-frequency patterns of the positive polarity of the write data. Further, when the detected difference is a negative value, the magnetic disk device 1 adjusts an occurrence frequency of the high-frequency patterns of the negative polarity of the write data. The magnetic disk device 1 adjusts the high-frequency patterns of the write data of the polarity corresponding to the detected difference, whereby the magnetic disk device 1 can reduce the detected difference. The detected difference has a correlation with the error rate. Accordingly, by reducing the difference, the error rate is reduced. Therefore, a magnetic disk device by which the data recording quality is improved is provided.

Next, magnetic disk devices according to modification examples will be described below. In each modification example, parts identical to the above-mentioned embodiment are denoted by reference symbols identical to the embodiment, and detailed descriptions of the parts are omitted.

Modification Example 1

A magnetic disk device 1 of a modification example 1 differs from the magnetic disk device 1 of the first embodiment in the method of adjusting a data pattern of write data configured to adjust the 1TM asymmetry.

FIG. 11 is a schematic view showing a configuration example of an R/W channel 50 of the magnetic disk device 1 according to the modification example 1. In FIG. 11, only configurations necessary for the explanation are shown.

In a system controller 130, the R/W channel 50 is provided with a detector 51, and write data controller 55. These units are constituted of, for example, circuits, and operations of the units are controlled by an MPU 30 or HDC 40.

The write data controller 55 subjects the write data to Write Pre-Compensation (WPC) (Recording Compensation) processing. The Write Pre-Compensation (Recording Compensation) processing is processing configured to previously shift the timing (rise timing and fall timing) of polarity reversal of a data pattern of write data by a length of time corresponding to Non Linear Transition Shift (NLTS). As an example, the write data controller 55 includes a pseudo-ECL (PECL) driver.

Further, the write data controller 55 adjusts the data pattern of the write data of the polarity corresponding to the 1TM asymmetric value on the basis of a detection result of the detector 51. For example, the write data controller 55 adjusts the data pattern of the write data of the polarity corresponding to the 1TM asymmetric value by the Pulse-Pairing WPC processing. It should be noted that the write data controller 55 may be configured to adjust the data pattern of the write data of the polarity corresponding to the 1TM asymmetric value by the Pulse-Pairing WPC processing after subjecting the write data to the Write Pre-Compensation (WPC) processing. Further, the write data controller 55 may be provided in the HDC 40 in the system controller 130.

Figure 12:
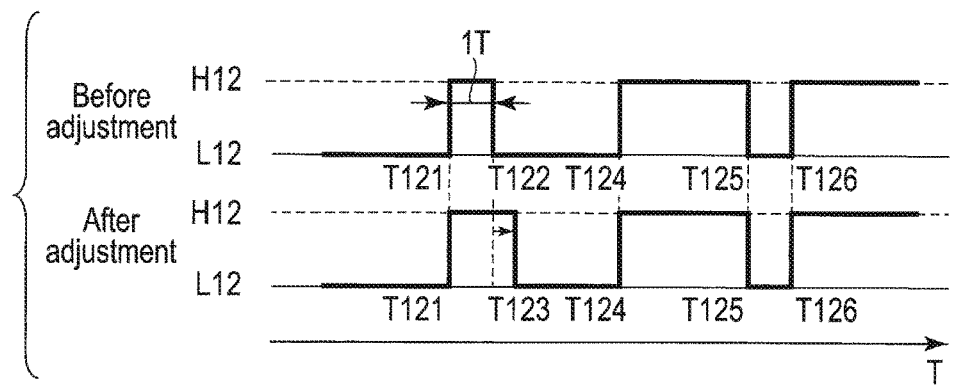
FIG. 12 is a view showing an example of Pulse-Pairing WPC processing.
Figure 13:
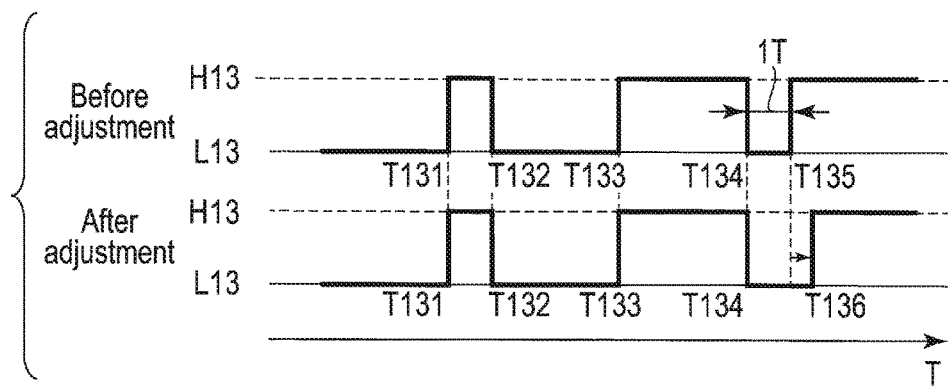
FIG. 13 is a view showing an example of Pulse-Pairing WPC processing.

Each of FIG. 12 and FIG. 13 is a view showing an example of Pulse-Pairing WPC processing. The data "before adjustment" (upper part of FIG. 12) shown in FIG. 12 indicates an example of data including a data pattern of 1T of the positive polarity before being adjusted by the Pulse-Pairing WPC processing, for example, a [011] series (dibit pattern), and the data "after adjustment" (lower part of FIG. 12) shown in FIG. 12 indicates an example of data including a data pattern obtained by adjusting the data pattern of 1T of the positive polarity in the data "before adjustment" shown in FIG. 12 by the Pulse-Pairing WPC processing. The data "before adjustment" (upper part of FIG. 13) shown in FIG. 13 indicates an example of data including a data pattern of 1T of the negative polarity before being adjusted by the Pulse-Pairing WPC processing, and the data "after adjustment" (lower part of FIG. 13) shown in FIG. 13 indicates an example of data including a data pattern obtained by adjusting the data pattern of 1T of the negative polarity in the data "before adjustment" shown in FIG. 13 by the Pulse-Pairing WPC processing. In FIG. 12 and FIG. 13, the axis of abscissa indicates the time T. In FIG. 12, a signal level H12 is higher than a signal level L12. In FIG. 12, timing T122 is timing after timing T121, timing T123 is timing after the timing T122, timing T124 is timing after the timing T123, timing T125 is timing after the timing T124, and timing T126 is timing after the timing T125. Further, a time interval between the timing T121 and timing T122 is 1T. In FIG. 13, a signal level H13 is higher than a signal level L13. In FIG. 13, timing T132 is timing after timing T131, timing T133 is timing after the timing T132, timing T134 is timing after the timing T133, timing T135 is timing after the timing T134, and timing T136 is timing after the timing T135. Further, a time interval between the timing T135 and timing T134 is 1T.

In the Pulse-Pairing WPC processing, the write data controller 55 executes processing of shifting fall timing or rise timing of a data pattern of 1T while limiting the execution of the processing to the polarity corresponding to the 1TM asymmetric value exceeding the threshold. That is, the write data controller 55 executes processing of widening the width of the dibit pattern. For example, when the 1TM asymmetric value is a positive value and exceeds the threshold, the write data controller 55 adjusts the data pattern of 1T of the data "before adjustment" shown in FIG. 12 rising at the timing T121 and falling at the timing T122 to the data pattern of the data "after adjustment" shown in FIG. 12 having the time interval wider than 1T and falling at the timing T123. Further, when the 1TM asymmetric value is a negative value and exceeds the threshold, the write data controller 55 adjusts the data pattern of 1T of the data "before adjustment" shown in FIG. 13 falling at the timing T134 and rising at the timing T135 to the data pattern of the data "after adjustment" shown in FIG. 13 having the time interval wider than 1T and rising at the timing T136.

Figure 14:
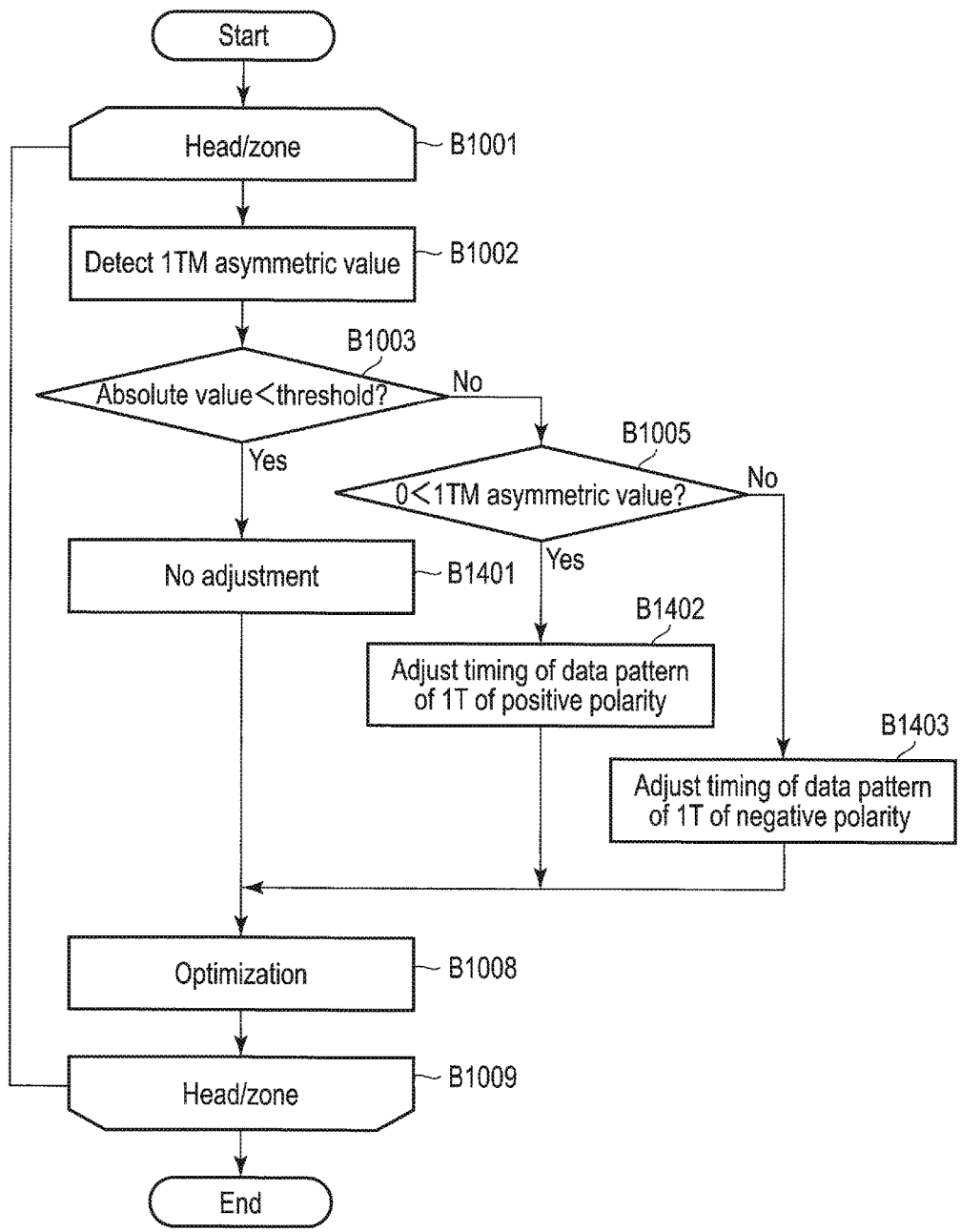
FIG. 14 is a flowchart of write processing according to the modification example 1.

FIG. 14 is a flowchart of write processing according to the modification example 1.

The controller 130 executes the processing from B1001 through B1003. Upon determination that the absolute value of the 1TM asymmetric value is smaller than the threshold (YES of B1003), the controller 130 does not adjust the data pattern of the write data (B1401), and advances to the processing of B1008. Upon determination that the absolute value of the 1TM asymmetric value is greater than or equal to the threshold (NO of B1003), the controller 130 determines whether the 1TM asymmetric value is greater than 0 or is smaller than 0 (B1005). Upon determination that the 1TM asymmetric value is greater than 0 (YES of B1005), the controller 130 adjusts the fall timing of the data pattern of 1T of the positive polarity (B1402), and then advances to the processing of B1008. Upon determination that the 1TM asymmetric value is smaller than 0 (NO of B1005), the controller 130 adjusts the rise timing of the data pattern of 1T of the negative polarity (B1403), and then advances to the processing of B1008. The controller 130 executes the processing of B1008 and B1009, and terminates the write processing.

According to the modification example 1, in the signal processing of write data, the magnetic disk device 1 detects a percentage by which high-frequency patterns of the positive polarity are lost, and percentage by which high-frequency patterns of the negative polarity are lost to thereby detect a difference between the percentage by which the high-frequency patterns of the positive polarity are lost and percentage by which the high-frequency patterns of the negative polarity are lost. The magnetic disk device 1 determines whether an absolute value of the detected difference is smaller than a threshold or is greater than or equal to the threshold. Upon determination that the absolute value of the detected difference is greater than or equal to the threshold, the magnetic disk device 1 determines whether the detected difference is a positive value or is a negative value. When the detected difference is a positive value, the magnetic disk device 1 adjusts the timing of polarity reversal of the high-frequency pattern of the positive polarity of the write data. Further, when the detected difference is a negative value, the magnetic disk device 1 adjusts the timing of polarity reversal of the high-frequency pattern of the negative polarity of the write data. The magnetic disk device 1 adjusts the high-frequency pattern of the write data of the polarity corresponding to the detected difference, whereby the magnetic disk device 1 can reduce the detected difference. Accordingly, a magnetic disk device by which the data recording quality is improved is provided.

Modification Example 2

A magnetic disk device 1 of a modification example 2 differs from the magnetic disk device 1 of the above-mentioned embodiment in the method of adjusting a data pattern of write data configured to adjust the 1TM asymmetry.

Figure 15:
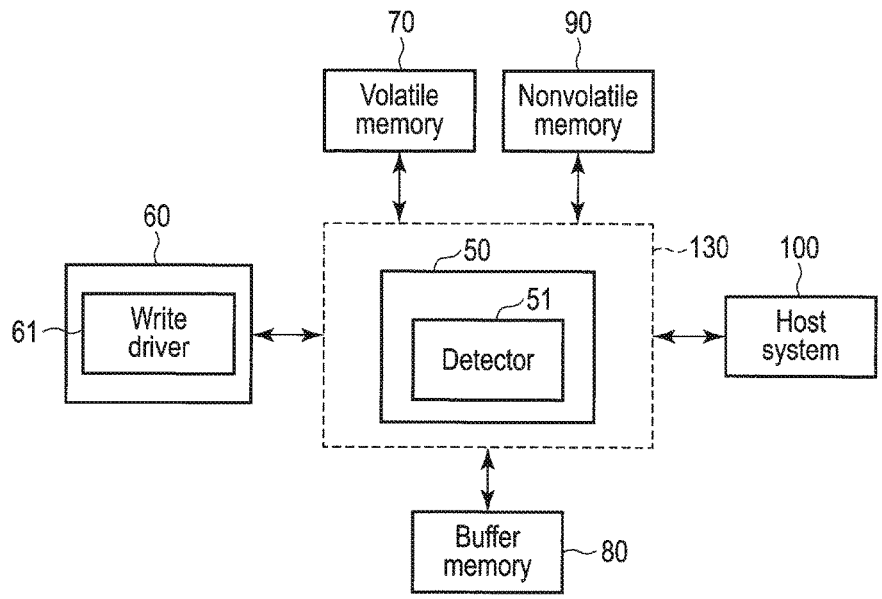
FIG. 15 is a schematic view showing a configuration example of an R/W channel of a magnetic disk device according to a modification example 2.

FIG. 15 is a schematic view showing a configuration example of an R/W channel 50 of the magnetic disk device 1 according to the modification example 2. In FIG. 15, only configurations necessary for the explanation are shown.

In a system controller 130, the R/W channel 50 is provided with a detector 51.

A head amplifier IC 60 is provided with a write driver 61. The write driver 61 is constituted of, for example, a circuit, and an operation thereof is controlled by an MPU 30 or HDC 40.

The write driver 61 creates a write current on the basis of write data input thereto from the R/W channel 50, and outputs the created write current to the write head 15W.

Further, the write driver 61 adjusts a data pattern of the write data of the polarity corresponding to the 1TM asymmetric value on the basis of a detection result of the detector 51. For example, the write driver 61 adjusts a data pattern of a write current of the polarity corresponding to the 1TM asymmetric value by the Write Asymmetry processing. It should be noticed that the write driver 61 may also be configured to create a write current by the normal processing on the basis of write data input thereto from the R/W channel 50, and thereafter adjust a data pattern of a write current of the polarity corresponding to the 1TM asymmetric value by the Write Asymmetry processing.

Figure 16:
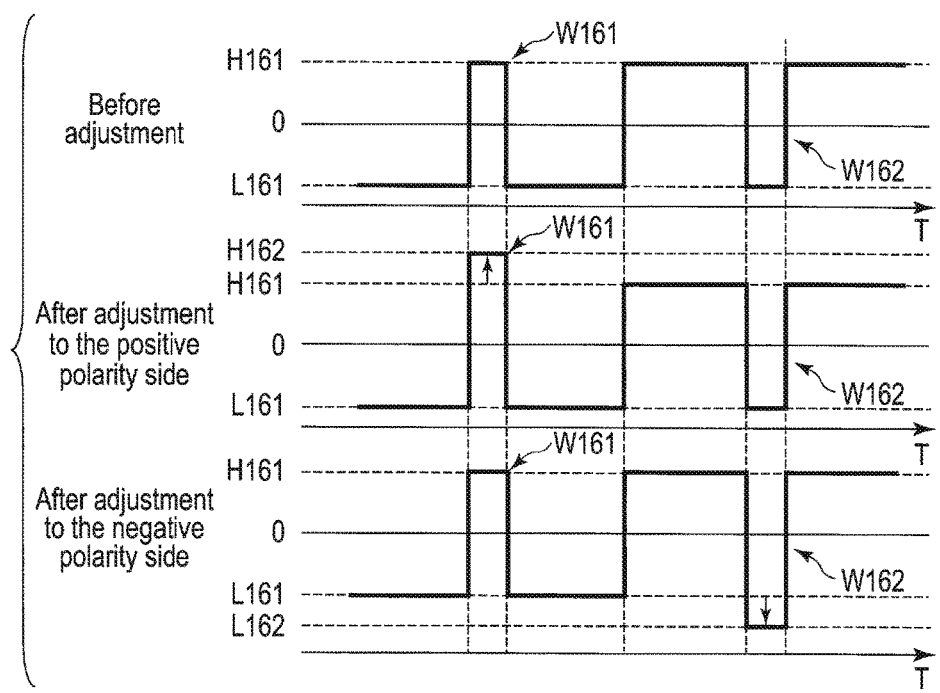
FIG. 16 is a view showing an example of Write Asymmetry processing.

FIG. 16 is a view showing an example of Write Asymmetry processing. A write current "before adjustment" (upper part of FIG. 16) shown in FIG. 16 indicates an example of a write current including a data pattern of 1T of the positive polarity and data pattern of 1T of the negative polarity before being adjusted by the Write Asymmetry processing. Each of a write current "after adjustment to the positive polarity side" (middle part of FIG. 16) shown in FIG. 16 and write current "after adjustment to the negative polarity side" (lower part of FIG. 16) shown in FIG. 16 indicates an example of the write current "before adjustment" (upper part of FIG. 16) shown in FIG. 16 after being adjusted by the Write Asymmetry processing. In FIG. 16, 0 indicates that the signal level is 0. A signal level (amplitude) H161 is a positive signal level. A signal level (amplitude) H162 is a positive signal level, and is higher than the signal level (amplitude) H161. A signal level (amplitude) L161 is a negative signal level. A signal level L162 is lower than the signal level (amplitude) L161.

In the Write Asymmetry processing, the write driver 61 executes processing of adjusting a signal level of a write current of a data pattern of 1T of the polarity corresponding to the 1TM asymmetric value exceeding the threshold. For example, when the 1TM asymmetric value is a positive value and exceeds the threshold, the write driver 61 increases the signal level H161 of the data pattern W161 of 1T of the positive polarity in the write current "before adjustment" shown in FIG. 16 to the signal level H162 as the write current "after adjustment to the positive polarity side" shown in FIG. 16. For example, when the 1TM asymmetric value is a negative value and exceeds the threshold, the write driver 61 lowers (shifts the signal level L161 toward the negative level side) the signal level L161 of the data pattern W162 of 1T of the negative polarity in the write current "before adjustment" shown in FIG. 16 to the signal level L162 as the write current "after adjustment to the negative polarity side" (lower part of FIG. 16) shown in FIG. 16.

It should be noticed that in the Write Asymmetry processing, the write driver 61 can also execute processing of adjusting the signal levels of the write current of the data patterns of 1T of the polarity corresponding to the 1TM asymmetric value exceeding the threshold and of the reversed polarity.

When the 1TM asymmetric value is a positive value and exceeds the threshold, the write driver 61 increases (i.e., the write driver 61 shifts the signal level toward the positive signal level side) the signal level of the data pattern of 1T of the negative polarity. When the 1TM asymmetric value is a negative value and exceeds the threshold, the write driver 61 lowers the signal level of the data pattern of 1T of the positive polarity. As described above, by reducing the signal levels of the data patterns of 1T of the polarity corresponding to the 1TM asymmetric value and of the reversed polarity, it is also possible to make the 1TM asymmetry close to 0.

Figure 17:
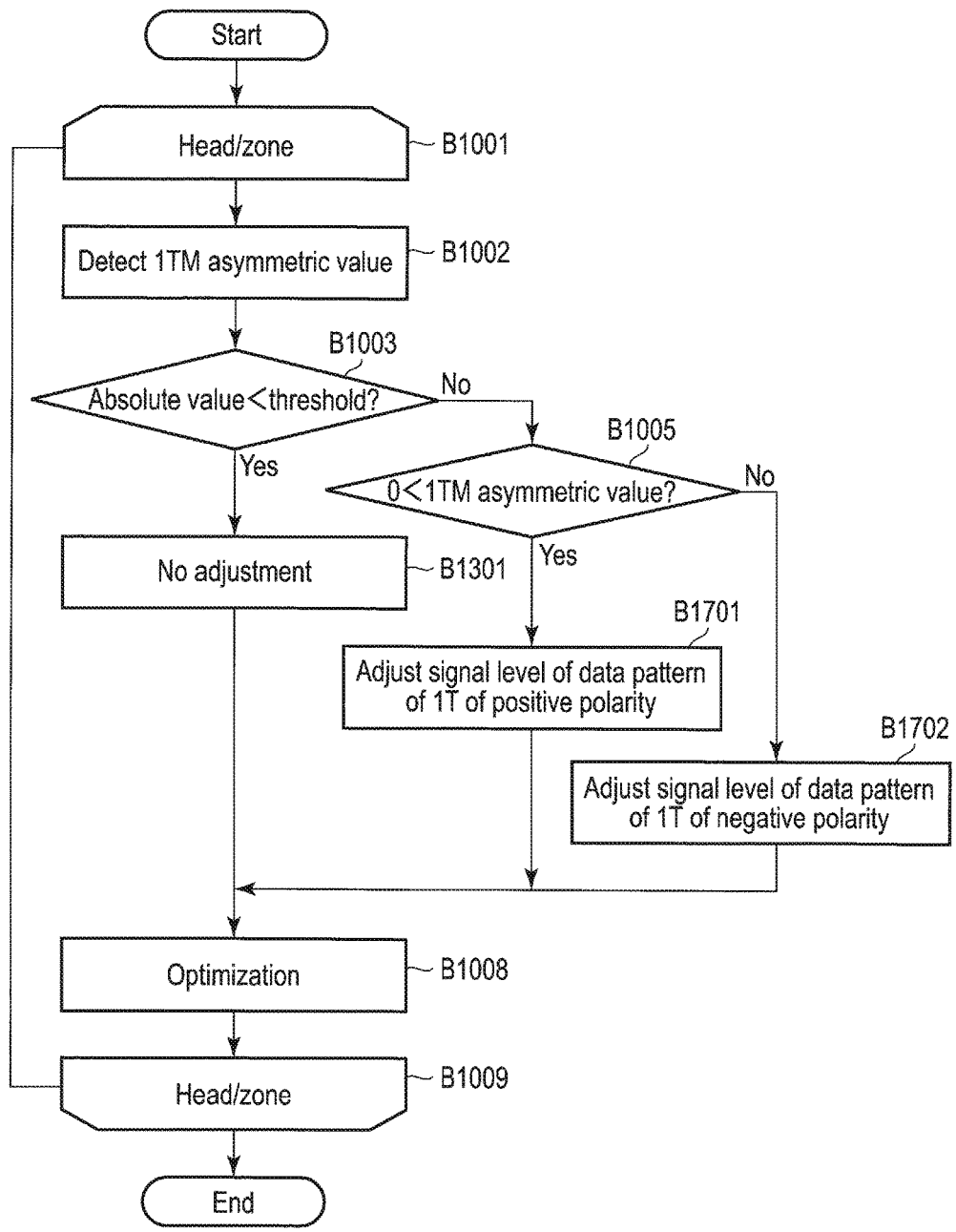
FIG. 17 is a flowchart of write processing according to the modification example 2.

FIG. 17 is a flowchart of write processing according to the modification example 2.

The controller 130 executes the processing from B1001 through B1005. Upon determination that the 1TM asymmetric value is greater than 0 (YES of B1005), the controller 130 adjusts the signal level of the data pattern of 1T of the positive polarity (B1701), and then advances to the processing of B1008. For example, the controller 130 increases the signal level of the data pattern of 1T of the positive polarity, and then advances to the processing of B1008. Upon determination that the 1TM asymmetric value is smaller than 0 (NO of B1005), the controller 130 adjusts the signal level of the data pattern of 1T of the negative polarity (B1702), and then advances to the processing of B1008. For example, the controller 130 lowers (i.e., the controller 130 shifts the signal level toward the negative signal level side) the signal level of the data pattern of 1T of the negative polarity, and then advances to the processing of B1008. The controller 130 executes the processing of B1008 and B1009, and then terminates the write processing.

Figure 18:
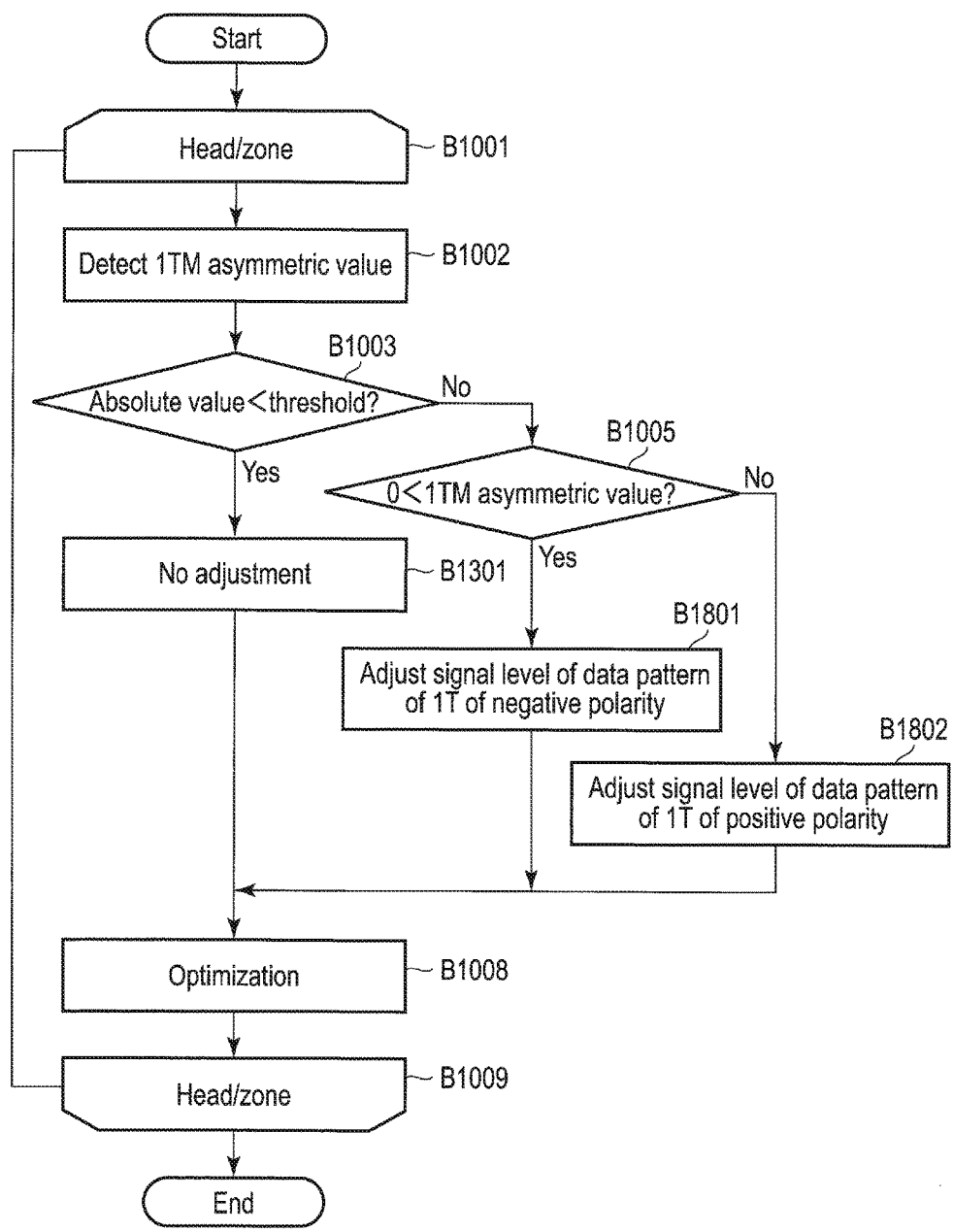
FIG. 18 is a flowchart of write processing according to the modification example 2.

FIG. 18 is a flowchart of write processing according to the modification example 2.

The controller 130 executes the processing from B1001 through B1005. Upon determination that the 1TM asymmetric value is greater than 0 (YES of B1005), the controller 130 adjusts the signal level of the data pattern of 1T of the negative polarity (B1801), and then advances to the processing of B1008. For example, the controller 130 increases (i.e., the controller 130 shifts the signal level toward the positive signal level side) the signal level of the data pattern of 1T of the negative polarity, and then advances to the processing of B1008. Upon determination that the 1TM asymmetric value is smaller than 0 (NO of B1005), the controller 130 adjusts the signal level of the data pattern of 1T of the positive polarity (B1802), and then advances to the processing of B1008. For example, the controller 130 lowers the signal level of the data pattern of 1T of the positive polarity, and then advances to the processing of B1008. The controller 130 executes the processing of B1008 and B1009, and then terminates the write processing.

According to the modification example 2, in the signal processing of write data, the magnetic disk device 1 detects a percentage by which high-frequency patterns of the positive polarity are lost, and percentage by which high-frequency patterns of the negative polarity are lost to thereby detect a difference between the percentage by which the high-frequency patterns of the positive polarity are lost and percentage by which the high-frequency patterns of the negative polarity are lost. The magnetic disk device 1 determines whether an absolute value of the detected difference is smaller than a threshold or is greater than or equal to the threshold. Upon determination that the absolute value of the detected difference is greater than or equal to the threshold, the magnetic disk device 1 determines whether the detected difference is a positive value or is a negative value. When the detected difference is a positive value, the magnetic disk device 1 adjusts the signal level of a high-frequency pattern of the positive or negative polarity of the write data. Further, when the detected difference is a negative value, the magnetic disk device 1 adjusts the signal level of a high-frequency pattern of the positive or negative polarity of the write data. The magnetic disk device 1 adjusts the high-frequency pattern of the write data of the polarity corresponding to the detected difference, whereby the magnetic disk device 1 can reduce the detected difference. Accordingly, a magnetic disk device by which the data recording quality is improved is provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head configured to write data to the disk; and
   a controller configured to write first data including a high-frequency pattern, detect, from a reproduced waveform obtained by reading the written first data, a difference between a first percentage by which high-frequency patterns of a first polarity are lost and a second percentage by which high-frequency patterns of a second polarity obtained by reversing the first polarity are lost, and adjust a high-frequency pattern of the first polarity of the write data or a high-frequency pattern of the second polarity of the write data on the basis of the difference.

2. The magnetic disk device of claim 1, wherein the controller determines whether the difference is smaller than a threshold or is greater than or equal to the threshold, determines, when it is determined that the difference is greater than or equal to the threshold, whether the difference is a first value or is a second value of a sign opposite to the first value, and adjusts, when it is determined that the difference is the first value, the high-frequency pattern of the first polarity.

3. The magnetic disk device of claim 2, wherein in the first data, the controller reduces an occurrence frequency of the high-frequency patterns of the first polarity.

4. The magnetic disk device of claim 3, wherein in the first data, the controller reverses the polarity of the high-frequency pattern of the first polarity.

5. The magnetic disk device of claim 2, wherein in the first data, the controller shifts the timing of polarity reversal of the high-frequency pattern of the first polarity.

6. The magnetic disk device of claim 2, wherein in the first data, the controller adjusts a current of the high-frequency pattern of the first polarity.

7. The magnetic disk device of claim 2, wherein in the first data, the controller adjusts a current of the high-frequency pattern of the second polarity.

8. The magnetic disk device of claim 1, wherein the controller determines whether the difference is smaller than a threshold or is greater than or equal to the threshold, determines, when it is determined that the difference is greater than or equal to the threshold, whether the difference is a first value or is a second value of a sign opposite to the first value, and adjusts, when it is determined that the difference is the second value, the high-frequency pattern of the second polarity.

9. The magnetic disk device of claim 1, wherein the controller detects the first percentage on the basis of second data formed by repetitively subjecting a data pattern in which an interval between polarity reversals is greater than the high-frequency pattern to polarity reversal and third data including the high-frequency pattern of the first polarity, and detects the second percentage on the basis of the first data and fourth data including the high-frequency pattern of the second polarity.

10. A write processing method to be applied to a magnetic disk device including a disk and a head configured to write data to the disk comprising:
writing first data including a high-frequency pattern;
detecting, from a reproduced waveform obtained by reading the written first data, a difference between a first percentage by which high-frequency patterns of a first polarity are lost and a second percentage by which high-frequency patterns of a second polarity obtained by reversing the first polarity are lost; and
adjusting a high-frequency pattern of the first polarity of the write data or a high-frequency pattern of the second polarity of the write data on the basis of the difference.

11. The write processing method of claim 10, further comprising:
determining whether the difference is smaller than a threshold or is greater than or equal to the threshold;
determining, when it is determined that the difference is greater than or equal to the threshold, whether the difference is a first value or is a second value of a sign opposite to the first value; and
adjusting, when it is determined that the difference is the first value, the high-frequency pattern of the first polarity.

12. The write processing method of claim 11, further comprising reducing, in the first data, an occurrence frequency of the high-frequency patterns of the first polarity.

13. The write processing method of claim 12, further comprising reversing, in the first data, the polarity of the high-frequency pattern of the first polarity.

14. The write processing method of claim 11, further comprising shifting, in the first data, the timing of polarity reversal of the high-frequency pattern of the first polarity.

15. The write processing method of claim 11, further comprising adjusting, in the first data, a current of the high-frequency pattern of the first polarity.

16. The write processing method of claim 11, further comprising adjusting, in the first data, a current of the high-frequency pattern of the second polarity.

17. The write processing method of claim 10, further comprising:
determining whether the difference is smaller than a threshold or is greater than or equal to the threshold;
determining, when it is determined that the difference is greater than or equal to the threshold, whether the difference is a first value or is a second value of a sign opposite to the first value; and
adjusting, when it is determined that the difference is the second value, the high-frequency pattern of the second polarity.

18. The write processing method of claim 10, further comprising:
detecting the first percentage on the basis of second data formed by repetitively subjecting a data pattern in which an interval between polarity reversals is greater than the high-frequency pattern to polarity reversal and third data including the high-frequency pattern of the first polarity; and
detecting the second percentage on the basis of the first data and fourth data including the high-frequency pattern of the second polarity.

* * * * *